(12) United States Patent
Shah

(10) Patent No.: US 6,490,327 B1
(45) Date of Patent: *Dec. 3, 2002

(54) SYSTEM AND METHOD FOR SELF-ADAPTIVE MAXIMUM LIKELIHOOD SEQUENCE DETECTION USING A T-ALGORITHM

(75) Inventor: Ali R. Shah, Dallas, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/223,456

(22) Filed: Dec. 30, 1998

(51) Int. Cl.[7] .................................................. H03D 1/00
(52) U.S. Cl. ........................ 375/341; 375/262; 375/340; 375/348; 714/704; 714/791
(58) Field of Search ................................. 375/341, 340, 375/232, 233, 249, 344, 262, 348; 714/704, 791

(56) References Cited

U.S. PATENT DOCUMENTS 4,797,887 A * 1/1989 Yammasaki et al. ........ 714/791
5,901,182 A * 5/1999 Kot ............................. 375/341
6,134,277 A * 10/2000 Shah .......................... 375/341
6,154,507 A * 11/2000 Bottomley ................... 375/340

* cited by examiner

Primary Examiner—Stephen Chin
Assistant Examiner—Shuwang Liu
(74) Attorney, Agent, or Firm—Jenkens & Gilchrist, P.C.

(57) ABSTRACT

A telecommunications system and method is disclosed for employing an improved self-adaptive maximum likelihood sequence detection technique using a T-algorithm and its variants in order to reduce signal distortion in cellular networks. If the noise variance is known, the T-algorithm computes the metric for all the branches in the stack and computes an expected value of the desired metric. Each branch not within a small, predefined deviation from the desired metric is discarded. However, if the noise variance cannot be reliably estimated, the T-algorithm used is similar to the previously described T-algorithm, except that the comparison is with the overall best path with the minimum metric. In other words, the path with the minimum value of the metric is computed and all paths within the small, predetermined deviation of this metric are retained and the remaining are deleted from the stack.

17 Claims, 4 Drawing Sheets

SYSTEM AND METHOD FOR SELF-ADAPTIVE MAXIMUM LIKELIHOOD SEQUENCE DETECTION USING A T-ALGORITHM

BACKGROUND OF THE PRESENT INVENTION

1. Field of the Invention

The present invention relates generally to telecommunications systems and methods for improved signal reception, and more particularly to a system and method for improved self-adaptive maximum likelihood sequence detection.

2. Background and Objects of the Present Invention

Cellular telecommunications is one of the fastest growing and most demanding telecommunications applications ever. Today it represents a large and continuously increasing percentage of all new telephone subscriptions around the world. In many cases, cellular solutions successfully compete with traditional wireline networks, such as the Public Switched Telephone Network (PSTN). In the long term, cellular systems, using a digital technology, will become the universal method of telecommunication.

However, one technical difficulty that still needs to be adequately addressed in wireless telecommunications is signal distortion. For example, on top of additive white Gaussian noise (AWGN), a signal to a receiver within a cellular network is subject to multipath fading. A propagation delay is caused by the multiple propagation paths to the receiver due to buildings or terrain. As a result of time delays across the different paths, a succession of discrete pulses representing symbols transmitted across a communications channel are smeared to the point that they are no longer distinguishable as well-defined pulses at the receiving terminal. Instead, the received symbols overlap somewhat causing intersymbol interference (ISI).

With reference now to FIG. 1 of the drawings, there is illustrated a mathematical model of ISI. This is a filter of order L+1, where 'L' is the number of memory elements in the filter and L+1 is the number of filter coefficients ($\theta_0, \ldots \theta_L$). In particular, a symbol stream of discrete symbols $s_k$, each a member of a defined and finite alphabet A\, is forwarded on a given channel of a transmitter 10, which has channel coefficients $\theta$ combined therein, which represent the intersymbol interference, to a receiver 14. Along the transmission route 12 to the receiver 14, a noise component $n_k$ is added, represented by adder 16, which further alters the symbol stream signal into a different symbol stream signal $v_k$, which is received by the receiver 14.

The process of undoing the effects of ISI is referred to as equalization. To assist in equalizing the aforementioned altered symbol stream $v_k$ received at the receiver 14, digital telecommunications standards employing Time Division Multiple Access (TDMA) technology, like that of the Global System for Mobile communications (GSM) and the IS-136 standards, employ training or synchronization sequences to facilitate signal demodulation. For example, in GSM, systems employ time slots to transmit a 156.25-bit message, where 22 or more of those bits are utilized as training for channel equalization. It should be understood that synchronization is absolutely necessary in certain circumstances, i.e., to initially align the receiver 14 with the transmitter's 10 signal.

In conventional systems, even after such synchronization occurs, i.e., after establishing timeslot alignment, there is still a need for the training bits in each timeslot. It should be apparent, however, that by minimizing or eliminating the use of these equalization training bits in each time slot, particularly after synchronization has been achieved, this would dramatically increase the information throughput without significant changes to the protocol. In any event, the GSM system utilizes the aforementioned 22 bits as training bits throughout all timeslots of the transmission.

Through the use of the training bits, ISI is corrected in current systems by using the training bits for channel equalization. This is accomplished by ascertaining the aforementioned channel coefficients $\ominus$ for that communications route or link 12 and modifying (demodulating) the incoming signal in accordance with these coefficients. As a result of the dispersive nature of channels across the time domain due to the noise $n_k$, each channel coefficient $\ominus$ is multiplied with the incoming information, i.e., symbols. It should be understood to those skilled in the art that, with a channel behaving as a filter, the phenomenon of ISI may itself also be modeled as a filter.

The length of the filter is the extent of ISI, and is denoted by 'L+1'. Accordingly, in a situation where there is no ISI, the channel may be modeled with a single non-zero channel coefficient, where all other coefficients are zero, e.g., 1,0,0. In this example, channel coefficients characterize the behavior of the channel. Assuming L=2, then with ISI, all of the remaining channel coefficients are also non-zero, e.g., 1, 0.5, 0.2.

Accordingly, the receiver 14 must demodulate the incoming symbol stream, $v_k$, and overcome both the signal dispersion and the background noise present (AWGN). With the conventional channel equalization technique, both ISI and AWGN are overcome by the use of the aforementioned training sequence bits. As discussed, having knowledge of a transmission result, such as the known training sequence value, one may ascertain what the channel did to the outgoing signal and accordingly demodulate the received signal into the appropriate symbols.

A well-known symbol estimation/detection technique employed to perform maximum likelihood sequence estimation (MLSE) on the input symbol stream is the Viterbi algorithm, which dynamically estimates the most probable sequence of data symbols by maximizing a likelihood function describing the received signal. In general, for a binary system attempting to decipher an N-bit input symbol string, a brute force approach ($2_N$) is computationally infeasible, in that it is of exponential order. It should be understood, of course, that for an alphabet of size M, $M^N$ comparisons are required.

The Viterbi algorithm greatly simplifies this exponential order analysis by focusing on a discrete sequence of candidate symbols stored within L memory elements of the filter, i.e., L symbols in length. As an example, for N=156 bits, representing a time burst's binary data information or symbol content, L may be as low as 2, where bounding the analysis to 4 states ($2^2$) is preferred. With the two binary values conventionally represented by +1 and −1, these four states of the filter memory elements are as follows:

States

-1, +1

+1, +1

+1, +1

In the dynamic programming approach described by the Viterbi algorithm, the incremental shortest path for each state is ascertained, maximizing the likelihood function linearly.

The Viterbi algorithm, although currently the technique of choice in the sequence analysis art, primarily for its linear order computational simplicity, nonetheless has its shortcomings. For instance, the Viterbi algorithm requires foreknowledge of the channel and its coefficients, which in the wireless environment are constantly changing due to channel fading, propagation delays and other signal interference conditions. To adaptively equalize the signal from timeslot to timeslot, the Viterbi algorithm therefore requires the aforementioned training bits, which provide the requisite channel coefficient information enabling the receiver to demodulate the signal dynamically.

Although the Viterbi algorithm operates best in situations where the channel coefficients are known, in the case of blind equalization, i.e., where there is no foreknowledge of the channel coefficients, the Viterbi algorithm has proved suboptimal. Thus, the Viterbi algorithm is not well suited for a self-adaptive sequence detection technique, particularly in the blind equalization context, which attempts to detect the transmitted sequence without resorting to a training sequence. Therefore, alternative methodologies are required in such instances.

Such alternative methodologies include tree-search algorithms, such as the M-algorithm, the Fano algorithm and the stack algorithm. The reason for calling these algorithms "tree-search" algorithms is that the most likely sequence is searched for by traversing an enumeration tree. Each algorithm has a root node at the beginning of the tree that splits into branches and so on. However, the way to progress down the tree varies in each algorithm.

In the Fano algorithm, the single most likely path is traced through the tree. At each node, a metric is calculated and compared with a certain threshold. If the metric satisfies the threshold, the path continues. Otherwise, the path is retraced and an alternative is sought. If no better alternative is found, the original path is continued at a lowered threshold.

The M-algorithm retains the "M" best sequences in a stack. It extends each sequence of the "M" in the stack to "b" branches to obtain bM candidates in the stack, where "b" is the alphabet size. The metric is computed for each sequence and the paths are sorted in descending order. The M best paths are retained, while the rest are deleted. The M algorithm can also be referred to as the extend all nodes of stack-algorithm. Alternatively, in the stack algorithm, several of the most likely paths are stored in decreasing order of likelihood in a stack. The continuations of the current most likely path are computed and the stack is updated with reordering if necessary.

As discussed previously, the Fano algorithm allows backtracking, and therefore, the metric has to be modified to decide when to backtrack. Similarly, the metric for the stack algorithm has to be modified to allow comparison of sequences of unequal lengths. Each algorithm continues until all the observations have been processed and the terminal node has been reached. However, such "backtracking" causes an unknown delay time that can cause uncertainty when decoding speech frames. Since each speech frame needs to be decoded within a limited period of time, having an unknown delay time can reduce the effectiveness of the equalization process.

It is, therefore, an object of the present invention to employ an improved self-adaptive maximum likelihood sequence detection technique in order to reduce signal distortion in cellular networks.

SUMMARY OF THE INVENTION

The present invention is directed to telecommunications systems and methods for employing an improved self-adaptive maximum likelihood sequence detection technique using a T-algorithm or variants thereof in order to reduce signal distortion in cellular networks. If the noise variance is known, the T-algorithm computes the metric for all the paths in the stack and computes an expected value of the desired metric. Each path not within a small, predefined deviation from the desired metric is discarded. In an alternative embodiment, if the noise variance cannot be reliably estimated, the T-algorithm used is similar to the previously described T-algorithm, except that the comparison is with the overall best path with the minimum metric. In other words, the path with the minimum value of the metric is computed and all paths within the small, predetermined deviation of this metric are retained and the remaining are deleted from the stack. Advantageously, irrespective of which T-algorithm is utilized, the stack size is variable and not constant, which implies that the discard criterion is metric based. Therefore, although the T-algorithm utilizes a threshold, no backtracking is required.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

Figure 1:
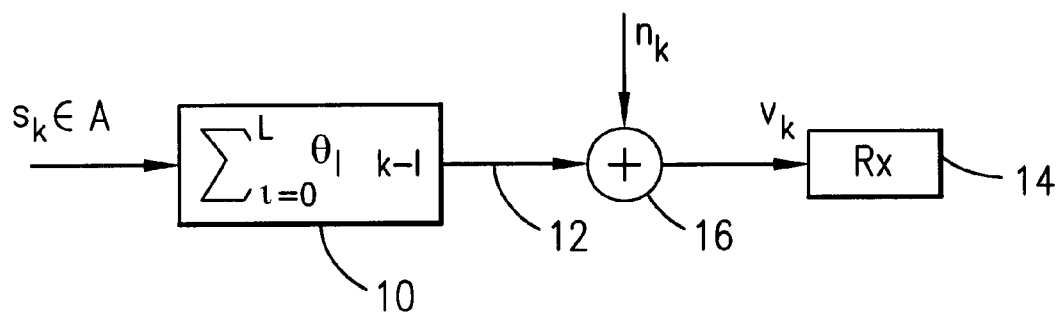
FIG. 1 is a block diagram illustrating the introduction of intersymbol interference and other noise into a data stream of symbol characters.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Many techniques have been devised to overcome the problems associated with intersymbol interference or ISI. As discussed, when the channel and its particular coefficients $\ominus$ are known, sequential estimation algorithms, such as the Viterbi algorithm, are optimally utilized for maximum likelihood sequence estimation (MLSE), i.e., dynamically estimating the most probable sequence of data symbols by maximizing the likelihood function of the received signal.

Algorithms, such as Viterbi's, however, are optimum only if the channel coefficients ⊖ for the transmission channel are known, particularly if a metric that arises from MLSE can be implemented recursively. It should be understood that a "metric" in this art means a measure of goodness. For the aforementioned Viterbi and other algorithms, a metric is an indication of the probability of a path being taken given the demodulated symbol sequence.

For example, in Viterbi's algorithm, the last L symbols describe the state a particular symbol sequence is in. Only one sequence is retained per state. A key idea in this methodology is that it is necessary to compute the metric for each state at the $k^{th}$ stage given that each preceding k−1 state is a known survivor. In this manner, knowledge of the past L symbols is needed to decide the survivors or most likely sequences for the next stage. The process is incrementally advanced, such as across nodes in an enumeration or decision tree, without backtracking.

In more detail, the most likely sequence is the one that maximizes the joint probability density function (jpdf) of the observation v given the transmitted sequence and the channel coefficients:

$$p(v|s, \theta) = \prod_{k=1}^{N-L} p(v_k|s_k, s_{sk-1}, \ldots, s_{k-L}, \theta_0, \ldots, \theta_L) \quad (1)$$

Assuming that the noise is Gaussian, the jpdf may be explicitly written in (1) as:

$$p(v|s, \theta) = \prod_{k=1}^{N-L} \frac{1}{\sqrt{2\pi\sigma^2}} \exp\left(-\frac{1}{2\sigma^2}\left|v_k - \sum_{l=0}^{L} \theta_l s_{k-l}\right|^2\right) \quad (2)$$

It should, therefore, be understood that the sequence that maximizes (2) also maximizes the log of the density function. Taking the log yields the likelihood expression which allows simplification of the exponential term. Maximizing this expression over all sequences s yields the maximum likelihood sequence estimate. Let ŝ denote the estimated sequence and s and v are vectors comprising the input symbols and observations, respectively. The most likely sequence can then be estimated by minimizing:

$$\hat{s} = \arg \min_{s_1, s_2, \ldots s_N} \sum_{k=1}^{N+L} \left|v_k - \sum_{l=0}^{L} \theta_l s_{k-l}\right|^2 \quad (3)$$

$$= \arg \min_s \|v - S\theta\|^2$$

Where S is an (N+L)×(L+ +1) matrix whose columns are shifted versions of the transmitted sequence:

$$S = \begin{vmatrix} s_1 & 0 & 0 & \ldots & 0 \\ s_2 & s_1 & 0 & \ldots & 0 \\ \vdots & \vdots & \vdots & \vdots & \vdots \\ s_N & s_{N-1} & s_{N-2} & \ldots & s_{N-L} \\ 0 & s_N & s_{N-1} & \ldots & \vdots \\ \vdots & \vdots & s_N & \ldots & s_{N-1} \\ 0 & 0 & \ldots & \ldots & s_n \end{vmatrix}$$

and the received vector of observations is v=S⊖+n.

At time "k", the matrix $S_k$ denotes shifted versions of the sequence $s_k=[S_1, S_2, \ldots, S_k]$, and is represented as the matrix:

$$S_k = \begin{vmatrix} s_1 & 0 & 0 & \ldots & 0 \\ s_2 & s_1 & 0 & \ldots & 0 \\ \vdots & \vdots & \vdots & \vdots & \vdots \\ s_k & s_{k-1} & s_{k-2} & \ldots & s_{k-L} \end{vmatrix}$$

The received vector of observations at that instant, $v_k$ is denoted as: $v_k=S_k\theta+n$. The Viterbi algorithm set forth below can be used to find the most likely sequence. When the channel coefficients θ are unknown, they can be estimated, e.g., for k observations:

$$\theta_k = (S_k'S_k)^{-1}S_k'v_k \quad (4)$$

This criterion may be reformulated by replacing the estimate of θ from (4) in (3):

$$\hat{s}_k = \arg \min_{s_k} \|v_k - S_k(S_k'S_k)^{-1}S_k'v_k\|^2 \quad (5)$$

When the channel coefficients θ are unknown, an estimating metric can be constructed as follows:

$$\hat{s} = \arg \min_s d(s_k) \quad (6)$$

where $d(s_k) = \|v_k\|^2 - v'_k \, Ps_k \, v_k$, in which $d(s_k)$ is the estimated metric, and $Ps_k = S_k(S'_k S_k)^{-1} S'_k$, in which PSk is the projection matrix. Among all possible input sequences, the one which minimizes the metric in (6) is sought. The optimal sequence is the one that spans the signal sub-space containing the largest portion of the received signal energy.

Since this metric, $d(s_k)$ in (6), includes the nonlinear quantity $(S'_k S_k)^{-1}$, which cannot be written in an additive form, a metric for self-adaptive equalization using this quantity depends upon the whole N-bit sequence and not just the last L symbols. This, in turn, implies that the concept of a state variable is no longer useful, and that a principle known as Bellman's principle of optimality does not apply to self-adaptive MLSE. Therefore, dynamic programming techniques for resolving intersymbol interference (ISI), such as Viterbi algorithms, are not feasible for implementing sequential self-adaptive equalization techniques, where the channel coefficients are unknown.

Figure 2:
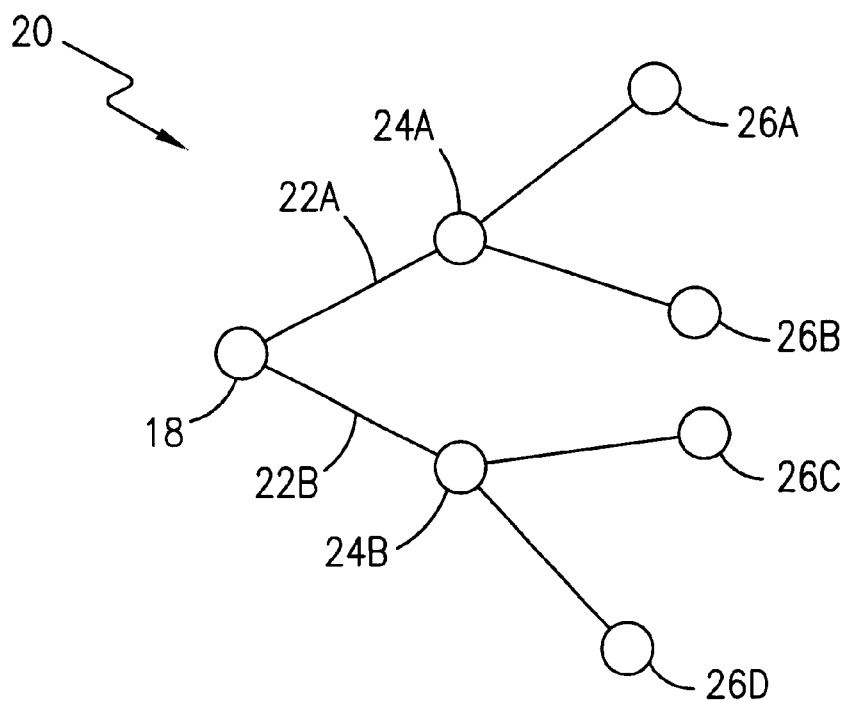
FIG. 2 illustrates an enumeration tree structure.

Instead, tree-search techniques, such as the Fano, M and stack algorithms can be utilized, which search the most likely sequence by traversing an enumeration tree, such as generally illustrated in FIG. 2. Tree search algorithms have a root node 18 at the beginning of the tree, generally referred to by the reference numeral 20, which splits into branches 22A and 22B to branch nodes 24A and 24B, respectively, which in turn subbranch into other nodes which may be leaf nodes 26A–D. Each leaf node 26A–D along with the respective path that leads to each respective leaf node is referred to as a stack. For example, one stack includes the root node 18, the branch node 22A and the leaf node 26A, while a second stack includes the root node 18, the branch node 22A and the leaf node 26B. Thus, the stack size is equivalent to the number of leaf nodes 26A–D.

With reference again to the block diagram in FIG. 1, in an effort to simplify the model for ISI, the Special case of a discrete-time finite-state Markov process is considered, where a sequence of equally likely symbols $s_k$ drawn from the discrete and finite alphabet A\ is input to a channel. This models the ISI, which can be represented by a finite impulse response filter whose coefficients are $\Theta_l$, where l=0 . . . L. As is understood to one skilled in this art, a larger value of L implies a greater length of intersymbol interference for analysis. For slowly varying mobile radio channels, channel coefficients are assumed to be unknown but constant. In the channel model shown in FIG. 1, the goal is to determine the most likely input sequence received by receiver 14 out of the $M^N$ possible candidate sequences where M is the alphabet size and N is the sequence length. As discussed hereinbefore, the Fano method requires "backtracking," which can create an unknown delay time. Consequently, a system and method that can approximate such a global search is needed that does not produce an unknown delay time. Therefore, the present invention is directed to another type of tree-search algorithm, known as the T-algorithm, which does not require backtracking. The T-algorithm can be considered a hybrid of the Fano algorithm and the M-algorithm. The ingredient in common with the M-algorithm is that a number of paths of a certain stack size is retained. However, unlike the M-algorithm, the stack size is variable. That variability is based upon a threshold that establishes the discard criterion. This threshold is the basis of the commonality with the Fano algorithm, which also keeps a running threshold for a discard criterion.

Figure 3:
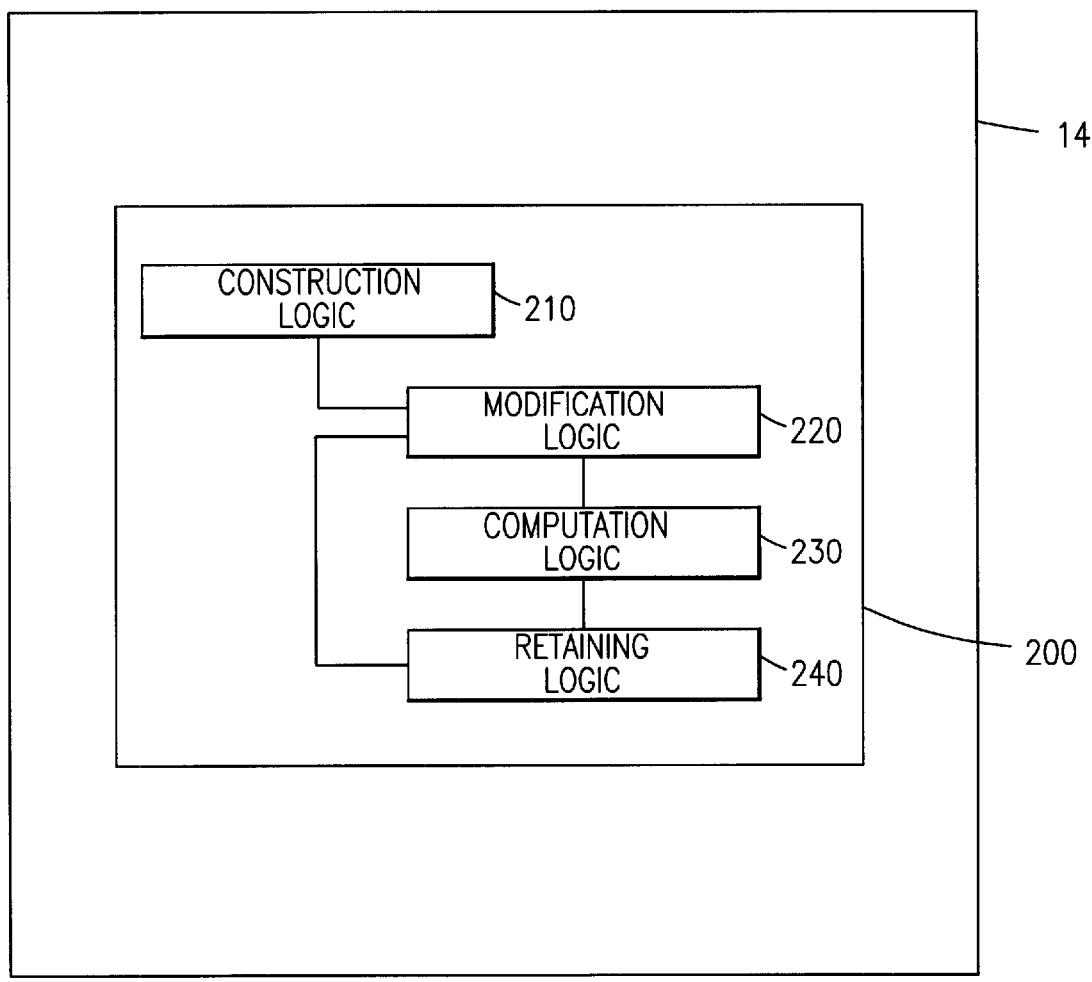
FIG. 3 illustrates a self-adaptive maximum likelihood sequence detector utilizing a T-algorithm in accordance with embodiments of the present invention.

The T-algorithm has been applied to equalization of QAM and to the problem of decoding convolutional codes. However, it has not yet been employed for self-adaptive equalization in order to reduce signal distortion in cellular networks. In brief, as shown in FIG. 3 of the drawings, after a receiver 14 receives the data stream of discrete symbols, which have been subject to intersymbol interference, construction logic 210 within a detector 200 within the receiver 14 constructs an enumeration tree based upon the received discrete symbols with a stack size $n_s$, and modification logic 220 extends each path in the stack to "b" branches of a tree. Computation logic 230 computes a metric value for each of the $n_s$b branches, and a desired metric value. Retaining logic 240 retains all of the paths having a computed metric value within a small, predetermined deviation Δ of the desired metric value, and discards all of the rest. The amount of the deviation Δ can be determined, for example, by the network operator.

For example, with reference again to FIG. 2 of the drawings, if the starting stack size is 2, which corresponds to branch nodes 24A–B, the tree is grown to leaf nodes 26A–D. The metric is calculated for each leaf node 26A–D, and the computed desired metric value is compared to the calculated metric value of each leaf node 26A–D. The leaf nodes 26A–D having a metric value within a Δ of the desired metric value are retained, while the rest are discarded. If, for example, the sequence length is three, and only leaf node 26A satisfies the desired metric value, then the most likely sequence of symbols is the path that includes the root node 18, the branch node 24A and the leaf node 26A.

Figure 4:
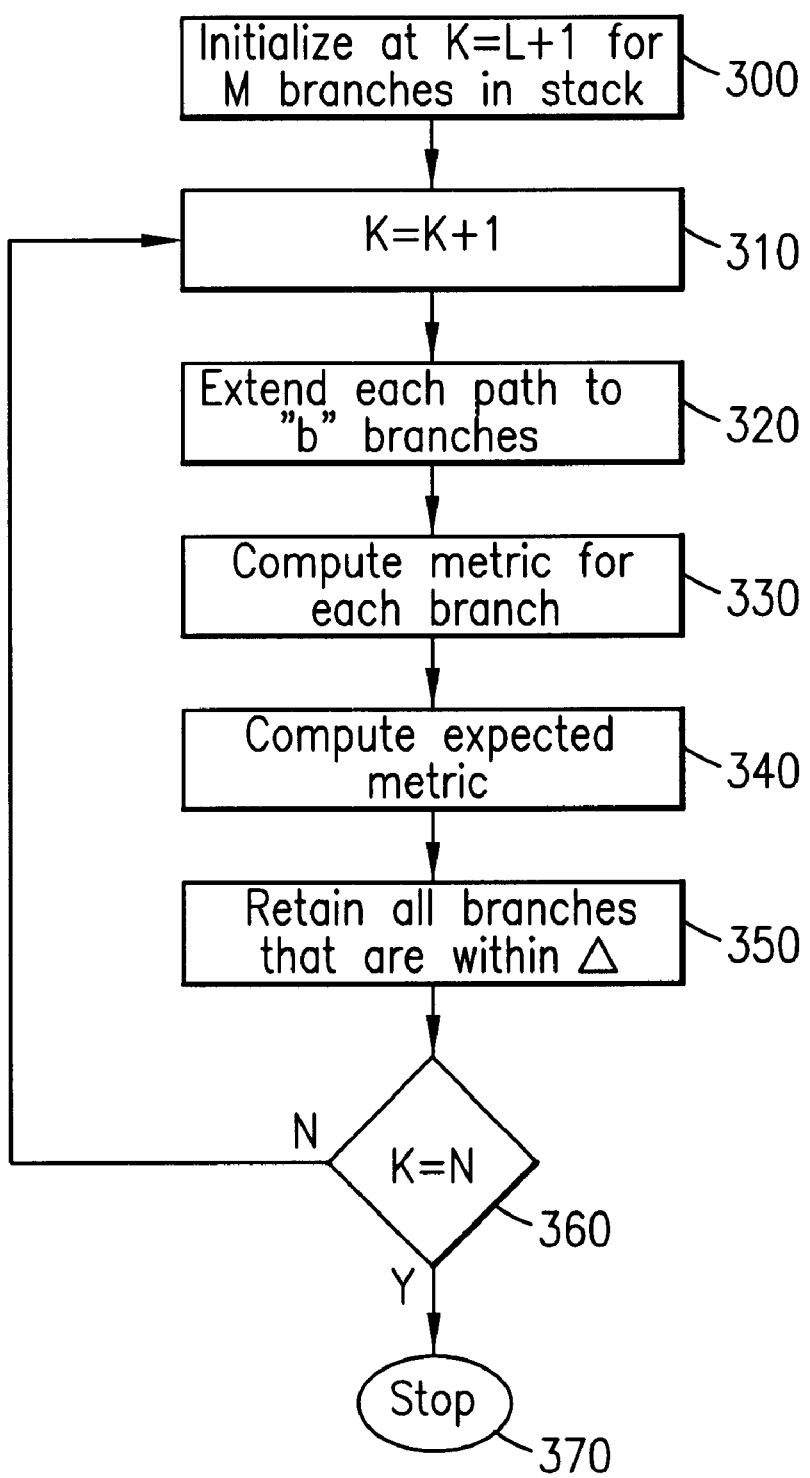
FIG. 4 is a flow diagram illustrating steps utilized in implementing a T-algorithm for self-adaptive maximum likelihood sequence detection with knowledge of the noise.

With reference now to FIG. 4 of the drawings, in one embodiment of the present invention, in which noise variance is known, the input data stream of symbols subject to ISI are received, and the stack of stack size $n_s$ is initialized at k=L+1 for M branch and/or leaf nodes 24A–B and/or 26A–D, respectively, in the stack (step 300), where k is a data stream positional counter, which ranges from L+1, which is the first unknown symbol position in the data stream, to N, which is the input data stream terminus. The positional counter k is incremented by one (step 310), and the stack is extended to "b" branches 22A–B (step 320) where "b" denotes the alphabet size, e.g., for BPSK, b=2, and for QPSK, b=4. Thereafter, the metric $d(s_k)$ defined hereinbefore is computed for all the branch and/or leaf nodes 24A–B and/or 26A–D, respectively, in the stack (step 330).

The T-algorithm computes an expected value of the metric at k (step 340), denoted as "E $(d(s_k))$" based upon the noise variance, and retains all paths that have a computed metric value that do not differ from the expected metric value by more than the deviation Δ (step 350). If the input data stream terminus has been reached (step 360), e.g., k=N, the T-algorithm stops (step 370) and the path with the minimum deviation Δ from the expected metric is selected as the maximum likelihood sequence of input symbols. However, if input data stream terminus has not been reached (step 360), the positional counter k is incremented (step 310), and the process is continued, with the stack size now being the number of branch and/or leaf nodes 24A–B and/or 26A–D, respectively, retained after the comparison (step 350).

Figure 5:
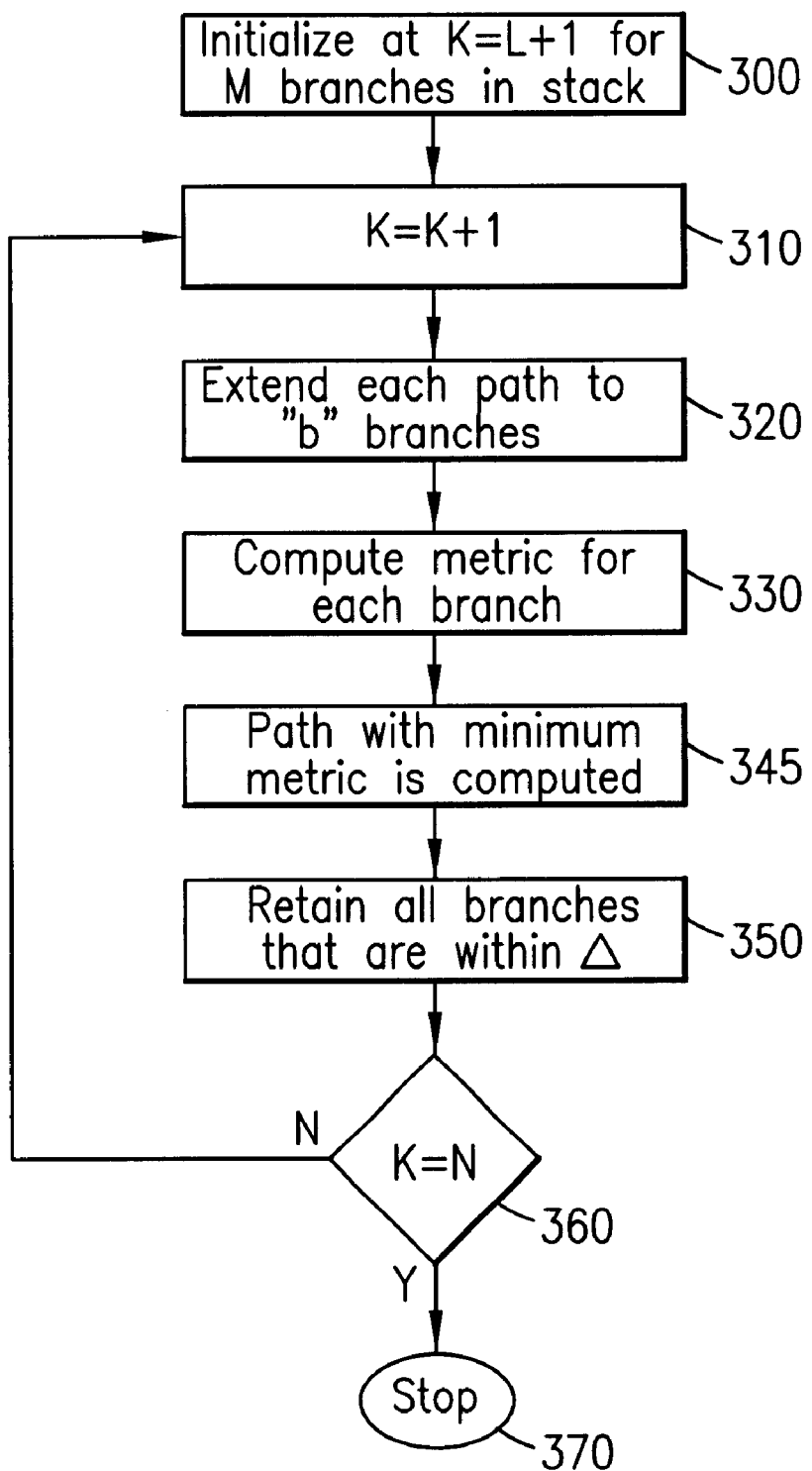
FIG. 5 is a flow diagram illustrating steps utilized in implementing a T-algorithm for self-adaptive maximum likelihood sequence detection without knowledge of the noise.

With reference now to FIG. 5 of the drawings, if the noise variance cannot be reliably estimated, the T-algorithm utilized is similar to the previously mentioned T-algorithm, except that after the metric value has been computed for each branch and/or leaf node 24A–B and/or 26A–D, respectively, in the stack (step 330), instead of computing the expected value of the metric (step 340 in FIG. 3), the path having the overall minimum value of the metric $d(s_k)$ is selected and an average metric based upon the metric of each node within the selected path is computed (step 345). All paths having a metric value within a Δ of this computed minimum metric are retained and the remaining are deleted from the stack (step 350).

Advantageously, irrespective of which variant of the T-algorithm is utilized, the stack size is variable and not constant. Having a variable stack size differentiates the T-algorithm from the M-algorithm in that the M-algorithm requires a fixed stack size. Depending on Δ, the number of paths that are stored can be greater or lesser than the fixed stack size algorithm. The effect of varying the stack size on the number of computations for each stage on average requires a lesser number of stored paths as compared to the M-algorithm. Therefore, the T-algorithm requires less storage, which in turn decreases the processor load. In addition, even though a metric-based discard criterion is used, the T-algorithm does not require backtracking, as in the Fano algorithm, which eliminates the undesirable unknown delay time associated with the Fano algorithm.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for detecting a maximum likelihood sequence of symbols within a transmitted input data stream, said symbols being subject to intersymbol interference during transmission, said method comprising the steps of:

constructing an enumeration tree of nodes for a given sequence of said input data stream containing said symbols, said enumeration tree having at least a root one of said nodes and a given number of end ones of said nodes grown from said root node, each said end node being included within a first stack having a size equivalent to said given number;

modifying said enumeration tree from said end nodes to include additional ones of said nodes, each said end node having at least two of said additional nodes branching therefrom;

computing a desired metric value of a metric;

computing, at each said respective additional node, a respective metric value of said metric associated with said given sequence of said symbols; and retaining select ones of said additional nodes having said respective metric value within a predetermined deviation from said desired metric value.

2. The method of claim 1, wherein said step of retaining further comprises the step of:

comparing said desired metric value with each said respective metric value at each said respective additional node.

3. The method of claim 1, wherein said enumeration tree enumerates respective paths for said symbols within said given sequence, each said respective path extending from said root node through a respective one of said end nodes and a respective one of said additional nodes associated with said end node, and further comprising the step of:

determining said respective path associated with said maximum likelihood sequence of said symbols comprising said root node, a given one of said respective end nodes and said select additional node associated with said given respective end node having said respective metric value closest to said desired metric value.

4. The method of claim 3, wherein said maximum likelihood sequence of said symbols comprises a given number of said symbols, and wherein said step of determining further comprising the step of:

reiterating said steps of modifying, computing said desired metric value, computing said respective metric value and retaining until the number of said nodes included within said respective path associated with said maximum likelihood sequence of said symbols equals said given number of said symbols.

5. The method of claim 1, further comprising the steps of:

including said select additional nodes within a second stack having a size equivalent to the number of said select additional nodes; and reiterating said steps of modifying, computing said desired metric value, computing said respective metric value and retaining for said second stack.

6. A telecommunications system, comprising:

a transmitter for transmitting a data stream of discrete symbols;

a receiver, in communication with said transmitter, for receiving said data stream from said transmitter, said symbols being subject to intersymbol interference during transmission from said transmitter; and a maximum likelihood sequence detector, attached to said receiver, for detecting a maximum likelihood sequence of said symbols for a given sequence of said received data stream, said maximum likelihood sequence detector comprising:

means for constructing an enumeration tree of nodes for said given sequence of said input data stream, said enumeration tree having at least a root one of said nodes and a given number of end ones of said nodes grown from said root node, each said end node being included within a first stack having a size equivalent to said given number, means for modifying said enumeration tree from said end nodes to include additional ones of said nodes, each said end node having at least two of said additional nodes branching therefrom, means for computing a desired metric value of a metric, and at each said respective additional node, a respective metric value of said metric associated with said given sequence of said symbols, and means for retaining select ones of said additional nodes having said respective metric value within a predetermined deviation from said desired metric value.

7. The telecommunications system of claim 6, wherein said retaining means further comprises:

means for comparing said desired metric value with each said respective metric value at each said respective additional node.

8. The telecommunications system of claim 6, wherein said enumeration tree enumerates respective paths for said symbols within said given sequence, said respective path associated with said maximum likelihood sequence of said symbols comprising said root node, a respective one of said end nodes and said select additional node associated with said respective end node having said respective metric value closest to said desired metric value.

9. The telecommunications system of claim 8, wherein said maximum likelihood sequence of said symbols comprises a given number of said symbols, said modifying means, said computing means and said retaining means being utilized to create said respective path associated with said maximum likelihood sequence of said symbols, wherein the number of said nodes included within said respective path associated with said maximum likelihood sequence of said symbols equals said given number of said symbols.

10. The telecommunications system of claim 8, wherein said desired metric value is an average metric value of each computed metric value associated with each said node within a given one of said respective paths having an overall minimum metric value.

11. The telecommunications system of claim 6, wherein said select additional nodes are included within a second stack having a size equivalent to the number of said select additional nodes, said modifying means, said computing means and said retaining means being reiterated for said second stack.

12. The telecommunications system of claim 6, wherein said enumeration tree comprises said root node and a plurality of branch nodes connected thereto.

13. The telecommunications system of claim 12, wherein said end nodes are said branch nodes.

14. The telecommunications system of claim 12, wherein each said branch node has at least two of said end nodes grown therefrom.

15. The telecommunications system of claim 12, wherein the number of said branch nodes equals the size of an alphabet of said symbols.

16. The telecommunications system of claim 15, wherein the size of said alphabet is two.

17. The telecommunications system of claim 15, wherein the size of said alphabet is four.

* * * * *

UNITED STATES PATENT AND TRADEMARK OFFICE
CERTIFICATE OF CORRECTION

PATENT NO. : 6,490,327 B1
DATED : December 3, 2002
INVENTOR(S) : Ali R. Shah

It is certified that error appears in the above-identified patent and that said Letters Patent is hereby corrected as shown below:

Column 2,
Line 47, replace "$(2_N)$" with -- $(2^N)$ --
Lines 60-67, Replace "-1, +1    With  ---1,  -1
              +1, +1              -1,  +1
              +1, +1"             +1,  -1
                                  +1,  +1--

Column 5,
Equation 1, replace " $p(v|s,\theta) = \prod_{k=1}^{N-L} p(v_k|s_k, s_{sk-1}, \ldots, s_{k-L}, \theta_o, \ldots, \theta_L)$ "

with -- $p(v|s,\theta) = \prod_{k=1}^{N+L} p(v_k|s_k, s_{sk-1}, \ldots, s_{k-L}, \theta_o, \ldots, \theta_L)$ --

Equation 2, replace " $p(v|s,\theta) = \prod_{k=1}^{N+L} \frac{1}{\sqrt{2\pi\sigma^2}} \exp\left(-\frac{1}{2\sigma^2}\left|v_k - \sum_{\ell=0}^{1} \theta_\ell s_{k-\ell}\right|^2\right)$ "

with -- $p(v|s,\theta) = \prod_{k=1}^{N-L} \frac{1}{\sqrt{2\pi\sigma^2}} \exp\left(-\frac{1}{2\sigma^2}\left|v_k - \sum_{\ell=0}^{1} \theta_\ell s_{k-\ell}\right|^2\right)$ --

Column 6,
Line 16, replace "of 0 from" with -- of $\theta$ from --
Line 26, replace "in which PSK" with -- in which $Ps_k$ --
Line 59, replace " the Special case" with -- the special case --
Line 64, replace "1=0 . . .L." with -- $\ell = 0 \ldots L.$ --

Column 7,
Line 5, delete "As discussed"
Line 6, insert -- As discussed -- before "hereinbefore,"

Signed and Sealed this

Fifth Day of August, 2003

JAMES E. ROGAN
*Director of the United States Patent and Trademark Office*